UNITED STATES PATENT OFFICE.

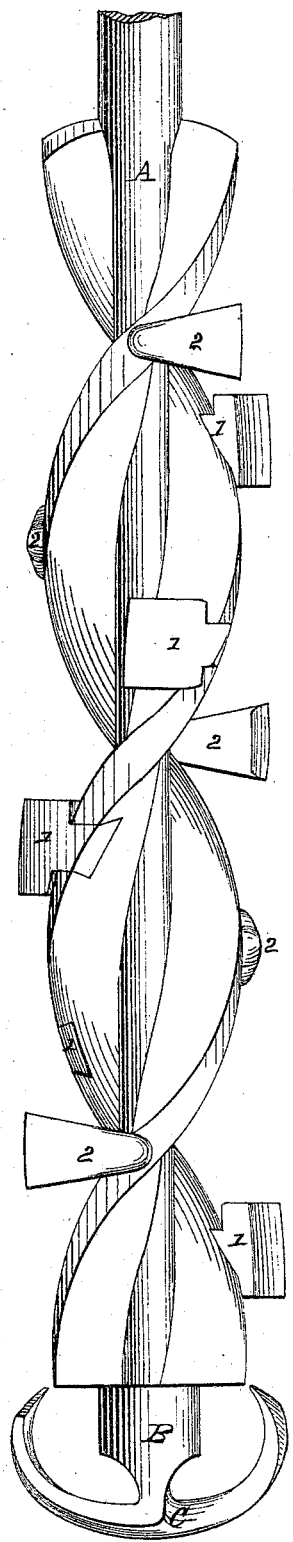

PORTER SHELDON, OF JAMESTOWN, NEW YORK.

IMPROVEMENT IN UNDERMINING-AUGERS.

Specification forming part of Letters Patent No. 143,535, dated October 7, 1873; application filed September 8, 1873.

*To all whom it may concern:*

Be it known that I, PORTER SHELDON, of Jamestown, in the county of Chautauqua and State of New York, have invented an Undermining Tool or Auger, of which the following is a specification:

My invention consists in affixing cutters by screwing, dovetailing, or other device along each helix or outer edge of the spirals of a properly shaped and twisted bar of steel or iron, so that the points or edges of the cutters shall overhang the concave surface of the twisted bar, combined with a cutter at the point of the auger, the cutters being so arranged that upon a rotary motion being given to the auger, and the same being fed against clay, bituminous coal, or other like substance, endwise, the cutter at the point will cut the way for the insertion of the auger to its full length in or under the substance to be undermined, and thereupon, on the auger being fed laterally at right angles to its rotary motion, the cutters along the spirals will cut a channel under the substance to be undermined, the cuttings falling into the concave surfaces of the auger, and being partially removed from the channel thereby, so as to leave the tool free from clogging.

This tool may be constructed by taking a bar of steel, A, of proper dimensions, and bevel it from each edge to near the center line, letting the bevel run down toward the center; upset and form a wrist on one end, by which to attach the tool, by a sleeve or other device, to a shaft; twist the bar from the wrist to the other end twice around; insert cutters by dovetailing, screwing, bolting, or other device along each flange of the twisted auger, so that the first cutter at the point 1 shall be followed by a second cutter, 2, on the other flange, cutting up to the cut made by the first cutter, and this cutter to be followed in the like manner by a third, and so on alternately, on either flange, along the whole length of the auger, so that one revolution of the auger will present to the substance being cut, cutting-edges to cover its entire length from wrist to point. Make the cutting-points C by taking a bar of steel; split the same in the center from one end to near the other; bend the parts separated outwardly and back over the end not split until they form two-thirds the shape of the letter D; tap the end not split, and screw the same onto the end B of the auger.

I contemplate applying the tool to undermine or channel coal, fire-clay, or other substance, by means of a carriage supporting two oscillating engines operated by compressed air, rotating a shaft, to either end of which shaft the auger may be attached by a sleeve or other device; the lateral feed to be communicated to the auger by moving the carriage at a right angle to the rotation of the auger.

I am aware of the invention of a boring-tool patented July 1, 1873, upon which my invention is an improvement. It differs materially from said invention in this, that while said tool is only constructed for slow work in hard substances, and operates by friction or grinding, and being tubular, revolving on a shaft, it cannot be provided with concave spiral grooves of sufficient capacity to carry out of a channel the cuttings incident to rapid progress in comparatively soft material without increasing its bulk and weight to such an extent as to render it impractical; and it is not provided with proper cutters to make practical progress in soft substances if fed laterally; while my invention is a twisted bar of steel, (not cylinder with grooves,) very light and strong, affording spiral concaves of much greater dimensions for removing cuttings than possible with the other invention, with cutters proper, which overhang the concaves, and operate on the substance opposed not by friction or grinding, but by cutting or chiseling, and capable of making rapid progress in the substances indicated.

I am also aware of the rejected case of A. G. Anderson, filed February 27, 1854, (class of dressing stone;) but cannot conceive wherein it in the least conforms in principle to my invention, it being simply a cylinder, with cutters inserted at right angles to the center in a spiral line around the cylinder, the groove around the cylinder being merely to facilitate the insertion of set-screws to hold the cutters in place, and the whole machine being only adapted to dressing the surface of stone.

What I claim as my invention, and desire to secure by Letters Patent, is—

The combination of an auger with cutters arranged along either flange or spiral overhanging the concaves from the wrist to the point or end, and with the cutter at the end thereof, substantially as and for the purposes hereinbefore set forth.

PORTER SHELDON.

Witnesses:
   GEORGE W. TEW, Jr.,
   BEN. T. MORGAN.